United States Patent
Zhang et al.

(10) Patent No.: US 11,090,839 B2
(45) Date of Patent: *Aug. 17, 2021

(54) SYSTEM FOR PRODUCING A LIGHTWEIGHT THERMOPLASTIC COMPOSITE SHEET

(71) Applicant: JOHNS MANVILLE, Denver, CO (US)

(72) Inventors: Mingfu Zhang, Englewood, CO (US); Jawed Asrar, Englewood, CO (US)

(73) Assignee: Johns Manville, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/460,661

(22) Filed: Jul. 2, 2019

(65) Prior Publication Data

US 2021/0001513 A1    Jan. 7, 2021

(51) Int. Cl.
*B29B 11/16* (2006.01)
*B29B 11/12* (2006.01)
*B29K 101/12* (2006.01)
*B29K 509/08* (2006.01)

(52) U.S. Cl.
CPC ............ *B29B 11/16* (2013.01); *B29B 11/12* (2013.01); *B29K 2101/12* (2013.01); *B29K 2509/08* (2013.01); *B29K 2995/0063* (2013.01)

(58) Field of Classification Search
CPC ..... B29B 11/16; B29B 11/12; B29B 2101/12; B29B 2995/0063; B29B 2509/08; B29B 13/02; B29B 13/06; B29B 15/122; B29C 70/504; B05C 9/14; B05C 11/021; B05C 9/10; B05D 3/0227; B05D 3/0272; B05D 3/12; D06M 15/71; D06M 15/705; D06M 15/51; B29K 2105/0872; B29K 2101/12; B29K 2105/256; C08J 5/24; B32B 2305/076; B29L 2009/00

USPC ............... 523/219; 428/221, 304.4, 313.3; 264/241, 259

See application file for complete search history.

(56) References Cited

U.S. PATENT DOCUMENTS

| | | | |
|---|---|---|---|
| 5,415,738 A | 5/1995 | Mehta et al. | |
| 5,741,744 A | 4/1998 | Fitchmun | |
| 7,438,839 B2 | 10/2008 | Simpson et al. | |
| 8,580,169 B2 | 11/2013 | Bell et al. | |
| 10,105,871 B2* | 10/2018 | Zhang | B29B 15/122 |
| 10,683,406 B2* | 6/2020 | Zhang | C08J 5/047 |
| 10,717,245 B2* | 7/2020 | Zhang | C08J 5/041 |
| 2008/0187739 A1* | 8/2008 | Baker | B29C 70/086 |
| | | | 428/297.7 |
| 2009/0309260 A1 | 12/2009 | Keuchel | |
| 2015/0031257 A1 | 1/2015 | Ootsubo et al. | |
| 2016/0271860 A1 | 9/2016 | Mashima et al. | |
| 2017/0361546 A1 | 12/2017 | Zhang et al. | |
| 2018/0162107 A1 | 6/2018 | Xu et al. | |
| 2018/0229399 A1 | 8/2018 | Zhang et al. | |
| 2019/0229545 A1* | 7/2019 | Li | H02M 1/36 |
| 2020/0223161 A1* | 7/2020 | Zhang | C08J 3/242 |
| 2020/0230898 A1* | 7/2020 | Zhang | B29B 11/12 |

* cited by examiner

*Primary Examiner* — Hannah J Pak

(74) *Attorney, Agent, or Firm* — Robert D. Touslee

(57) ABSTRACT

A thermoplastic composite sheet may be composed of a polymer material matrix and a lightweight material that is disposed throughout the polymer material matrix. The polymer material matrix may extend continuously throughout a length, width, and thickness of the thermoplastic composite sheet. The polymer material matrix may be a fully polymerized thermoplastic material. The lightweight material may be fully saturated by the thermoplastic material of the polymer material matrix. The thermoplastic composite sheet may include between 50 and 99 weight percent of the thermoplastic material and between 1 and 50 weight percent of the lightweight material. The thermoplastic composite sheet may be free of reinforcing fibers.

19 Claims, 3 Drawing Sheets

SYSTEM FOR PRODUCING A LIGHTWEIGHT THERMOPLASTIC COMPOSITE SHEET

BACKGROUND

Thermoplastic composite sheets are gaining interest in the composite industry due to their superior properties such as impact resistance, thermoformability, and recyclability, as compared to thermoset sheets. One type of conventional thermoplastic composite sheets is organosheets based on fabrics, which are formed by weaving fiber bundles or rovings together. Because of the directionality of fiber orientation in fabrics, conventional thermoplastic organosheets show direction-dependent anisotropic mechanical properties, which poses significant challenges in designing composite parts to replace incumbent isotropic materials such as steel and aluminum. In addition, fabric-based thermoplastic composite sheets have limited conformability, which greatly increases the difficulty of forming composite parts with deep draws and complex geometries.

Another type of thermoplastic composite sheets is known as a glass mat thermoplastics (GMT). GMT is based on a glass mat that has randomly oriented fibers. To produce GMT, a glass mat, such as a needled mat, is formed first, followed by application of a thermoplastic resin onto a surface or surfaces of the glass mat. High pressure and long impregnation time are required to impregnate the glass mat with molten thermoplastic resin, due to the long flow length for the molten resin to travel from surface to interior of the mat.

The conventional thermoplastic composite sheets are produced in a two-step process. In the first step, a fiber substrate, such as fabric or mat, is produced. Fibers in the fabric or mat are either mechanically or chemically bonded. In the second step, a thermoplastic resin is applied to the fiber substrate, followed by resin impregnation. The two-step process adds cost and processing time to the production of conventional thermoplastic composite sheets.

BRIEF SUMMARY

The embodiments described herein provide thermoplastic composite sheets, and specifically systems and methods for making the same. According to one aspect, a system for manufacturing a thermoplastic composite sheet includes a double belt mechanism having an upper belt and a lower belt. The upper belt is positioned atop the lower belt and the lower belt has a longitudinal length that is substantially longer than the upper belt. The double belt mechanism is configured to compress materials that are passed through the double belt mechanism. The system also includes a lightweight material application mechanism that is positioned atop the lower belt. The lightweight material application mechanism is configured to apply a lightweight material atop the lower belt to form a layer of lightweight material atop the lower belt. The system further includes a resin applicator that is positioned atop the lower belt. The resin applicator is configured to apply a resin to the layer of lightweight material. The system additionally includes an oven that is configured to heat the resin as the lightweight material and the resin are moved through the oven in order to polymerize the resin or melt the resin. The system additionally includes a cooling mechanism that is configured to cool the resin and lightweight material to form the thermoplastic composite sheet. The double belt mechanism is used to compress the lightweight material and the resin as the lightweight material and resin are passed through the oven so that the resin is dispersed throughout the layer of lightweight material and saturates the lightweight material. The lightweight material has a density of between 0.1 and 1.0 $g/cm^3$ and the thermoplastic composite sheet is free of reinforcing fibers.

In some embodiments, the lightweight material application mechanism and the resin applicator are positioned immediately adjacent one another so that the lightweight material and the resin are dispersed essentially simultaneously atop the lower belt such that the resin is dispersed throughout the layer of lightweight material. The resin applicator may be a fiber chopper and/or a fiber scattering device that is configured to disperse polymer resin fibers atop the lower belt to form a web or mesh of polymer resin fibers. In such embodiments, the polymer resin fibers may be configured to melt within the oven to enable the resin to be mixed with and dispersed throughout the layer of lightweight material. The lightweight material application mechanism may be positioned immediately adjacent the fiber chopper and/or fiber scattering device so that the lightweight material is applied atop the lower belt as the polymer resin fibers are dispersed atop the lower belt. Alternatively, the fiber scattering device may be configured to disperse the polymer resin fibers and simultaneously apply the lightweight material atop the lower belt and as such, the fiber scattering device may function as both the lightweight material application mechanism and the resin applicator.

In other embodiments, the resin applicator may be a roller about which a thermoplastic resin film is wound. In such embodiments, the resin may be applied to the lightweight material by unrolling the thermoplastic resin film atop the lower belt so that the thermoplastic resin film is positioned under the lightweight material, atop the lightweight material, or both under and atop the lightweight material. In yet other embodiments, the resin applicator may be an extruder device that is configured to extrude a molten thermoplastic resin sheet atop the lightweight material or that is configured to extrude a molten thermoplastic resin sheet that includes the lightweight material. In yet other embodiments, the resin applicator may be a powder application device that is configured to apply a powder thermoplastic resin to the layer of lightweight material. The powder application device may be configured to apply a powder lightweight material simultaneously with the powder thermoplastic resin and as such, the powder application device may function as both the lightweight material application mechanism and the resin applicator.

The resin may include or consist of one or more of the following thermoplastic resins: polyolefins, polypropylene (PP), high-density polyethylene (HDPE), polyamides, polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM), polyethyleneimine (PEI), polyether ether ketone (PEEK), polyacrylonitrile, copolyacrylonitriles including poly(styrene-co-acrylonitrile) (SAN), or combinations thereof. The system may additionally include a drying mechanism that is configured to remove residual moisture from the lightweight material as the lightweight material is moved past the drying mechanism.

In other embodiments, the resin applicator may be a die that is configured to apply monomers or oligomers to the layer of lightweight material, in which the monomers or oligomers are polymerized in the oven to form a polymer material matrix within which the lightweight material is disposed. In such embodiments, the lightweight material may be homogenously mixed with the monomers or oligomers and the die may function as both the resin applicator and the lightweight material application mechanism so that the resin and the lightweight material are simultaneously applied atop the lower belt to form the layer of lightweight material with the resin dispersed therein. When the system employs monomers or oligomers, the system may also include a drying mechanism that is configured to remove residual moisture from the lightweight material as the lightweight material is moved past the drying mechanism and/or a gas application mechanism that is positioned to blow a moisture-free gas onto one or more surfaces of the layer of lightweight material in order to substantially prevent exposure of the monomers or oligomers to ambient moisture in a surrounding environment.

The system may further include a mixing component that mixes the monomers or oligomers with at least one of a catalyst and/or an activator, in which the catalyst and/or activator facilitate in polymerizing the monomers or oligomers to form the polymer material matrix. The monomers or oligomers may include or consist of lactams, lactones, cyclic olefins, cyclic butylene terephthalate (CBT), methyl methacrylate (MMA), precursors of thermoplastic polyurethane, or mixtures thereof. In such embodiments, the lactams may include or consist of caprolactam, laurolactam, or mixtures thereof.

The lightweight material may include a sizing composition having a coupling agent that promotes bonding between the lightweight material and the resin. The system may additionally include a cutting mechanism that cuts the thermoplastic composite sheet into individual sheets. The cutting mechanism may be positioned after the oven. The lightweight material may include or consist of hollow glass microspheres, perlite, or a combination thereof.

According to another aspect, a method of forming a thermoplastic composite sheet includes dispersing a lightweight material atop a lower belt of a double belt press mechanism to form a layer of the lightweight material atop the lower belt. The method also includes applying a resin to the layer of lightweight material and passing the layer of lightweight material and the resin through an oven that is configured to heat the resin as the lightweight material and the resin are moved through the oven. The method may further include passing the layer of lightweight material and the resin between the lower belt and an upper belt of the double belt press mechanism to press the resin and the lightweight material and thereby disperse the resin through the layer of lightweight material and fully saturate the lightweight material with the resin. The layer of lightweight material and the resin may be passed through the oven and double belt press mechanism simultaneously or sequentially in any order. The method may additionally include cooling the resin and the lightweight material to form the thermoplastic composite sheet. The lightweight material may have a density of between 0.1 and 1.0 g/cm$^3$ and the thermoplastic composite sheet may be free of reinforcing fibers.

In some embodiments, the resin may be applied simultaneously with the lightweight material atop the lower belt so that the resin is dispersed throughout the layer of lightweight material. The method may additionally include drying the lightweight material via a drying mechanism as the lightweight material is moved past the drying mechanism to remove residual moisture from the lightweight material.

In some embodiments, applying the resin may include dispersing polymer resin fibers atop the lower belt via a fiber chopper and/or a fiber scattering device to form a web or mesh of polymer resin fibers. The polymer resin fibers may be configured to melt within the oven to enable the resin to be mixed with and dispersed throughout the layer of lightweight material. The lightweight material may be dispersed immediately adjacent the fiber chopper and/or fiber scattering device so that the lightweight material is applied atop the lower belt as the polymer resin fibers are dispersed atop the lower belt. Alternatively, the fiber scattering device may be configured to disperse the polymer resin fibers and simultaneously apply the lightweight material atop the lower belt.

In another embodiment, applying the resin may include unrolling a thermoplastic resin film from about a roller so that the thermoplastic resin film is positioned atop the lower belt and is positioned under the lightweight material, atop the lightweight material, or both under and atop the lightweight material. In yet another embodiment, applying the resin may include extruding a molten thermoplastic resin sheet atop the lightweight material or extruding a molten thermoplastic resin sheet that includes the lightweight material. In yet another embodiment, applying the resin may include applying a powder thermoplastic resin to the layer of lightweight material via a powder application device. The powder application device may be configured to apply a powder lightweight material simultaneously with the powder thermoplastic resin so that the resin is applied to the lightweight material as the layer of lightweight material is formed. The resin may include or consist of one or more of the following thermoplastic resins: polyolefins, polypropylene (PP), high-density polyethylene (HDPE), polyamides, polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM), polyethyleneimine (PEI), polyether ether ketone (PEEK), polyacrylonitrile, copolyacrylonitriles including poly(styrene-co-acrylonitrile) (SAN), or combinations thereof.

In other embodiments, applying the resin may include applying monomers or oligomers to the layer of lightweight material, in which the monomers or oligomers are polymerized in the oven to form a polymer material matrix within which the lightweight material is disposed. The lightweight material may be homogenously mixed with the monomers or oligomers so that the resin and the lightweight material are simultaneously applied atop the lower belt to form the layer of lightweight material with the resin dispersed therein. When monomers or oligomers are used, the method may also include drying the lightweight material via a drying mechanism as the lightweight material is moved past the drying mechanism to remove residual moisture from the lightweight material and blowing a moisture-free gas onto one or more surfaces of the layer of lightweight material via a gas application mechanism to substantially prevent exposure of the monomers or oligomers to ambient moisture in a surrounding environment. The method may additionally include mixing the monomers or oligomers with at least one of a catalyst and/or an activator via a mixing component, in which the catalyst and/or activator facilitate in polymerizing the monomers or oligomers to form the polymer material matrix. The monomers or oligomers may include or consist of lactams, lactones, cyclic olefins, cyclic butylene terephthalate (CBT), methyl methacrylate (MMA), precursors of thermoplastic polyurethane, or mixtures thereof. The lactams may include or consist of caprolactam, laurolactam, or mixtures thereof.

In some embodiments, the method may additionally include applying a sizing composition to the lightweight material. The sizing composition may have a coupling agent that promotes bonding between the lightweight material and the resin. The method may additionally include cutting the thermoplastic composite sheet into individual sheets via a cutting mechanism. The lightweight material may include or consist of hollow glass microspheres, perlite, or a combination thereof.

According to another aspect, a thermoplastic composite sheet includes a composite sheet having a length, width, and thickness. The composite sheet is composed of a polymer material matrix that extends continuously throughout the length, width, and thickness of the composite sheet. The polymer material matrix is a fully polymerized thermoplastic material. The thermoplastic composite sheet also includes a lightweight material that is disposed throughout the polymer material matrix so that the lightweight material is fully saturated by the thermoplastic material of the polymer material matrix. The composite sheet includes between 50 and 99 weight percent of the thermoplastic material and between 1 and 50 weight percent of the lightweight material. The composite sheet is free of reinforcing fibers.

In some embodiments, the lightweight material has a density of between 0.1 and 1.0 g/cm$^3$. The lightweight material may include or consist of hollow glass microspheres, perlite, or a combination thereof. The lightweight material may include a sizing composition having a coupling agent that promotes bonding between the polymer material and the lightweight material. The polymer material may include or consist of nylons, polyolefins, PBT, PMMA, thermoplastic polyurethane, and combinations thereof. The polymer material may include or consist of polyolefins, polypropylene (PP), high-density polyethylene (HDPE), polyamides, polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM), polyethyleneimine (PEI), polyether ether ketone (PEEK), polyacrylonitrile, copolyacrylonitriles including poly(styrene-co-acrylonitrile) (SAN), or combinations thereof. The thermoplastic composite sheet may have a density of 1.1 gram per cubic centimeter or less.

BRIEF DESCRIPTION OF THE DRAWINGS

The present technology is described in conjunction with the appended figures.

Figure 1:
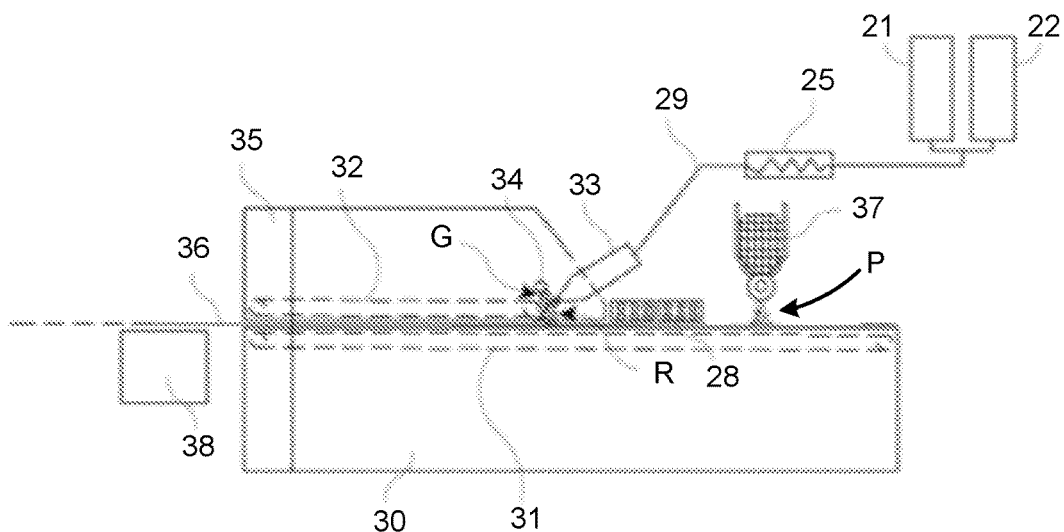
FIGS. 1-3 illustrate system that employ reactive resins to produce a thermoplastic composite sheet.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The embodiments described herein are directed to thermoplastic composite sheet products that include or consist of a polymer material matrix and a lightweight material that is dispersed within the polymer material matrix (hereinafter thermoplastic composite sheets). The thermoplastic composite sheets typically do not include any reinforcing fibers or other types of fibers, such as glass fibers, carbon fibers, basalt fibers, metal fibers, ceramic fibers, cellulosic fibers, natural fibers, aramid fibers, inorganic fibers, polymer fibers, or combinations thereof. The term "fibers" as used herein mean any fiber like material with an aspect ratio of greater than 1, in which the aspect ratio is measured as a length of the fiber like material to a width of the fiber like material.

The thermoplastic composite sheets are substantially lower in density in comparison with conventional prepregs, organosheets, or composite sheets that include reinforcing fibers and other materials. These thermoplastic composite sheets may be particularly useful in applications where weight is an issue or concern. A particularly useful application of the thermoplastic composite sheets is in the automotive or aerospace industries where the density and weight of components is very important for fuel efficiency purposes.

The density of the thermoplastic composite sheets is significantly reduced by adding a lightweight material to the polymer material matrix. The term "lightweight material" means a material that has a density of between 0.1 and 1.0 g/cm$^3$. The density of lightweight material is determined per the ISO 12154 (2014) test method. In a specific embodiment the lightweight material may be hollow glass microspheres, which are also commonly referred to as glass bubbles. In other embodiments, the lightweight material may be perlite or other lightweight materials. Hollow glass microspheres commonly have densities ranging from 0.10 to 0.60 g/cm$^3$ and are, therefore, significantly lighter than fibers and polymer materials that are commonly used in conventional prepregs, organosheets, and composite sheets. In some specific embodiments, the hollow glass microspheres may have densities about or lower than 0.40 g/cm$^3$.

Since the lightweight material is significantly lighter in density than the polymer material, adding an appreciable amount of the lightweight material to the thermoplastic composite sheet substantially reduces the overall density of the thermoplastic composite sheet. The lightweight material reduces the overall density of the thermoplastic composite sheet by occupying a volume or space within the thermoplastic composite sheet that would otherwise be filled or occupied by the heaver polymer materials and/or other materials. In some embodiments, the weight percentage of hollow glass microspheres in the thermoplastic composite sheet may be between 1% and 50%, preferably between 2% and 40%, and more preferably between 5% and 30%, based on the total weight of the thermoplastic composite sheet. The weight percentage of the lightweight material is determined via an incineration method in compliance with ISO 1172 (1996).

In some embodiments, the polymer material matrix of the thermoplastic composite sheet may be formed by polymerizing reactive resins, such as monomers and oligomers. The term thermoplastic polymer refers to polymers that are capable of being melted and molded or formed into various shapes multiple times. Thermoplastic composite sheets that include thermoplastic materials are capable of being shaped in a mold and formed or molded into various desired shapes.

The polymer material matrix may be formed via in-situ polymerization of the reactive resin. The lightweight material may be easily added to the reactive resin prior to polymerizing the reactive resin since the viscosity of the reactive resin is typically very low in the molten state. For example, the viscosity of the reactive resin is typically lower than 500 mPa·s, lower than 100 mPa·s, or even lower than 10 mPa·s. The low viscosity of the reactive resin enables the lightweight material to be easily mixed with the reactive resin and applied to a belt of a composite sheet forming system. The reactive resin may be applied using various devices or mechanisms, such as a slot die, curtain coater, roller coater, spray nozzle or mechanism, and the like.

In other embodiments, the lightweight material may be applied separately from and prior to the application of the reactive resin to a component of the composite sheet forming system. For example, a powder application mechanism may be positioned above a belt of the system and the lightweight material may be applied atop the belt prior to application of the reactive resin. Because of the low viscosity of the reactive resin, complete saturation of the lightweight material can be easily achieved in a short period of time, ensuring a high-speed manufacturing process.

In embodiments that employ reactive resins, the lightweight material is typically homogenously dispersed throughout the thermoplastic composite sheet, although in some embodiments, the lightweight material may form a layer that is concentrated toward, or positioned atop, a surface of the polymer material matrix. The lightweight material may also be sandwiched between opposing polymer material matrix layers. In reference to a homogenous dispersion of the lightweight material within the thermoplastic composite sheet, it should be realized that there is typically more thermoplastic material on the bottom of the thermoplastic composite sheet, which is due mainly to the reactive resin settling or migrating toward the bottom of the sheet during formation of the thermoplastic composite sheet and/or that is due to the lightweight material migrating or floating toward an upper surface of the composite sheet during formation. The homogeneity of the material may be increased by using appropriate ratios between lightweight material and reactive resin materials and/or by applying an appropriate amount of pressure to the lightweight material and/or reactive resin via the double belt mechanism.

In some embodiments, the polymer material matrix of the thermoplastic composite sheet may be formed by melting and cooling a fully polymerized thermoplastic resin. Fully polymerized thermoplastic resins have viscosities that are significantly greater than the viscosities of the reactive resins previously described. The thermoplastic resin may be added to the lightweight material so that a homogeneous mixture of the lightweight material and thermoplastic resin is formed. As the thermoplastic resin melts, the thermoplastic resin flows around the lightweight material so that the lightweight material is dispersed within the polymer material matrix. The high melt viscosity of the polymeric resin aids in maintaining the lightweight material within the polymer material matrix as the thermoplastic resin is melted and cooled. As such, separation of the thermoplastic material and lightweight materials is of far less concern than in comparison with reactive resin systems.

One method of homogenously mixing the thermoplastic material and the lightweight materials is by mixing powders of the lightweight material and the thermoplastic resin. Stated differently, a lightweight material powder may be mixed with a powder thermoplastic resin. The two powders may be mixed in a hopper or may be mixed by simultaneously dispersing the powders from separate powder application mechanisms that are positioned immediately adjacent one another. In the latter instance, the powders may mix as the powders fall from the respective powder application mechanisms. Another method of homogenously mixing the thermoplastic material and the lightweight materials is by mixing the lightweight material with polymer resin fibers. The lightweight material may be mixed with the polymer resin fibers in a hopper or may be mixed by positioning a fiber chopper or fiber scattering device immediately adjacent a lightweight material applicator and by simultaneously dispersing the materials so that the materials mix as they fall from the respective devices.

In other embodiments, the fully polymerized thermoplastic resin may be added to the lightweight material so that separate layers of the lightweight material and thermoplastic resin are formed. In such instances, the lightweight material is applied separately from the thermoplastic resin. For example, a lightweight material applicator may apply the lightweight material atop a belt of a composite sheet forming system and then the thermoplastic resin may be applied atop the lightweight material. The thermoplastic resin may be applied atop the lightweight material via a powder application mechanism, a fiber chopper or fiber scattering device, unrolling a thermoplastic resin film, or extrusion of molten thermoplastic resin. In such instances, the thermoplastic resin is typically melted and compressed in order to force the melted resin to flow within and around the lightweight material and thereby disperse the lightweight material within the polymer material matrix. The thermoplastic resin may then be cooled and hardened with the lightweight material positioned within the polymer material matrix.

In either the reactive resin systems or the fully polymerized resin system, the lightweight material may include a coating that facilitates bonding between the lightweight material and the resin. Stated differently, the lightweight material may be treated with a sizing composition including coupling agent(s) that promote bonding between the lightweight material and the resin. The one or more coupling agents may covalently bond the resin to the lightweight material. For example, a silane coating may be added to the surface of the hollow glass microspheres to increase the interfacial bonding between the microspheres and resin material. In the reactive resin systems, the silane coating could initiate polymerization of the reactive resin.

Exemplary coupling agents may include coupling-activator compounds having a silicon-containing moiety and an activator moiety. Specific examples of coupling-activator compounds include 2-oxo-N-(3-(triethoxysilyl)propyl) azepane-1-carboxamide. Exemplary coupling agents may also include blocked isocyanate coupling compounds having a silicon-containing moiety and a blocked isocyanate moiety. Exemplary coupling agents may also include coupling compounds having a functional group that may react with the reactive resin to form covalent bond. Specific example of the coupling compounds having a functional group include silane coupling agent having amino, epoxy, hydroxy, or ureido functional groups.

In addition to being lightweight, the hollow glass microspheres exhibit excellent strength properties and thus, the use of the hollow glass microspheres in the thermoplastic composite sheets imparts specific strength properties of the composite sheets, such as compression strength. In some embodiments a filler material may be added to the thermoplastic composite sheet in addition to, or as an alternative to, the lightweight material. The filler material, or filler materials, may be added to improve specific properties of the thermoplastic composite sheet and/or to lower a cost of the thermoplastic composite sheet. For example, the filler material, or filler materials, can affect the strength, toughness, heat resistance, flame retardancy, color, etc. of the thermoplastic composite sheet. Filler materials that can be added to the thermoplastic composite sheet include, but are not limited to, calcium carbonate, kaolin, talc, silica, titanium dioxide, alumina trihydrate, carbon black, and nanofillers such as carbon nanotubes and graphene.

For ease in describing the embodiments herein, the disclosure will refer to lightweight materials and lightweight material application mechanisms. It should be understood, however, that the terms "lightweight material" and "lightweight material application mechanism" may be substituted for any of the other filler materials described above. For example, the term "lightweight material" may be substituted for calcium carbonate material, kaolin material, talc material, silica material, titanium dioxide material, alumina trihydrate material, carbon black material, and/or nanofillers materials such as carbon nanotube materials and graphene materials, and the term "lightweight material application mechanism" may be substituted for calcium carbonate material application mechanism, kaolin material application mechanism, talc material application mechanism, silica material application mechanism, titanium dioxide material application mechanism, alumina trihydrate material application mechanism, carbon black material application mechanism, and/or nanofiller material application mechanisms such as carbon nanotube material application mechanism and graphene material application mechanism. In other embodiments, any one or any combination of the above terms may be used in addition to the terms "lightweight material" and "lightweight material application mechanism". As such, the terms may be amended or modified at any time to include or recite one of these other terms.

Having described the thermoplastic composite sheets generally, additional features and aspects of the thermoplastic composite sheets will be realized from the description of the various drawings that is provided herein below.

Reactive Resin Systems

As previously described, in some embodiments the polymer material matrix of the thermoplastic composite sheet may be formed by polymerizing reactive resins, such as monomers and oligomers. In order to achieve a commercially viable composite sheet product using monomer or oligomer materials, the conversion of the reactive resin to a polymer needs to be greater than 90% by weight and more commonly greater than 95% by weight. The residual monomer or oligomer content in the composite sheet can be measured via a solvent extraction method, which involves extraction of unreacted monomer or oligomer (e.g., caprolactam) from a powder of grounded composite sheet using hot water or organic solvents. The conversion of the reactive resin can be deduced based on the residual monomer or oligomer content.

The systems and methods described herein are able to achieve resin conversion rates that are greater than 90% by weight and more commonly greater than 95% by weight. In most embodiments, the conversion rate of the reactive resins is greater than 98% by weight or even greater than 99% by weight. The thermoplastic polymers in the polymer material matrix of the thermoplastic composite sheets are formed via in-situ polymerization of the reactive resins. In specific embodiments wherein the reactive resin comprises caprolactam, the systems are designed to include a drying mechanism and a gas application mechanism in order to achieve this high conversion rate in a continuous process. This continuous process greatly increases the efficiency of the manufacturing process, which decreases the overall cost of the final thermoplastic composite sheet product. The manufacturing time between application of the reactive resin and the formation of a thermoplastic composite sheet product may be less than 20 minutes, more commonly less than 10 minutes, and in some embodiments may be less than 5 minutes.

In an exemplary embodiment the reactive resin that is used to form the thermoplastic composite sheet is caprolactam. Caprolactam is extremely sensitive to moisture such that even a small amount of moisture can affect the anionic polymerization of the caprolactam. The presence of moisture can stop or interfere with the anionic polymerization of caprolactam into a polyamide-6 polymer. For example, a moisture content of greater than 200 ppm in the resin can significantly interfere with the polymerization process and lower the conversion of the caprolactam material to below 90% by weight. Because of the high moisture sensitivity of these materials, achieving a high conversion rate of the reactive resin materials to polymers is very difficult. As such, in systems that employ caprolactam or other moisture sensitive resins, the system is designed so that the system is substantially moisture-free in the vicinity of the reactive resin. The term "substantially moisture-free" or "substantially zero" in references to moisture or humidity recognizes that some level or amount of moisture may be present in the air. However, as used herein the term implies that any moisture present in the air is negligible, minor, insignificant, or otherwise inconsequential and is not sufficient to interfere with polymerization of the moisture sensitive reactive resin. In a specific embodiment, a "substantially moisture-free" environment may be created by employing a moisture purge mechanism that is operable to maintain the relatively humidity in the environment to be below 1% at under the temperature range of 5-35° C.

The system utilizes mixing of reactive resin components, followed by application of the reactive resin components onto a moving belt and typically onto the lightweight material. The reactive resin components are then cured in an oven to form the polymer material matrix of the polymer composite.

The reactive resins that are typically used in the system may include or consist of lactams, lactones, cyclic olefins, cyclic butylene terephthalate (CBT), methyl methacrylate (MMA), precursors of thermoplastic polyurethane, and/or mixtures thereof. The lactams may include or consist of caprolactam, laurolactam, lactones, and/or mixtures thereof. In an exemplary embodiment, the reactive resin comprises caprolactam. In some embodiments, mixtures of monomers and/or oligomers may be used. For example, a mixture of caprolactam and laurolactam may be used, which will copolymerize in the curing oven to form copolymers with tailored properties. The activator may be any material that activates and accelerates the polymerization of monomers or oligomers. Exemplary activators for the anionic polymerization of caprolactam include blocked isocyanates and N-acylcaprolactams. The catalyst may be any material that catalyzes the polymerization of monomers or oligomers. Exemplary catalysts for the anionic polymerization of caprolactam include alkaline salt of caprolactam such as sodium caprolactamate. The resulting thermoplastic polymers include or consist of nylons, polyolefins, PBT, PMMA, thermoplastic polyurethane, and/or combinations thereof.

Referring to FIG. 1, illustrated is a system that may be used to produce thermoplastic composite sheets as described herein. The system of FIG. 1 is capable of producing the thermoplastic composite sheets in a continuous process, in which a lower belt 31 of the system is essentially continually or constantly in movement through the system.

The system may include two vessels or holding tanks (i.e., 21 and 22). At least one of the holding tanks functions as a storage and delivery tank of a reactive resin, which is typically a monomer or oligomer that is polymerizable into a thermoplastic material. In some embodiments, the monomers or oligomers may include or consist of lactams, lactones, cyclic olefins, cyclic butylene terephthalate (CBT), methyl methacrylate, precursors of thermoplastic polyurethane, or mixtures thereof. The holding tanks, 21 and 22, may be heated and purged with nitrogen to ensure the removal of any moisture, which could otherwise reduce the reactivity of the raw materials and consequently reduce the conversion of the resins to a polymer. One of the holding tanks (e.g., holding tank 21) may contain a mixture of a resin and a catalyst. In a specific embodiment, the holding tank (e.g., tank 21) may include caprolactam and a catalyst, such as sodium caprolactamate or any other catalyst. The other holding tank (e.g., tank 22) may contain a mixture of the resin and an activator. In a specific embodiment, the other holding tank (e.g., tank 22) includes caprolactam and an activator, such as N, N'-hexane-1,6-diylbis(hexahydro-2-oxo-1H-azepine-1-carboxamide) or any other activator. The holding tanks, 21 and 22, may be heated to a temperature that allows the reactants to melt, such as between about 70 and 120° C. for the reactive resin that includes caprolactam. The molten reactants (e.g., the resin and activator or catalyst) have a very low viscosity as previously described. The viscosity of molten reactants can be measured according to the test method ISO 3104 (1999). As an example, molten caprolactam at the temperature of 80° C. has a viscosity of 8.5 mPa·s, as measured using ISO 3104 (1999).

The reactants from the two holding tanks, 21 and 22, are typically metered into a static mixer or mixing head 25 that ensures the correct ratio of the monomers and/or oligomers, activator, and catalyst is delivered. In one embodiment, the mixtures from the two holding tanks, 21 and 22, may be provided to the static mixer in a 1/1 ratio. The mixtures from the two holding tanks, 21 and 22, are thoroughly mixed in the static mixer 25 into a substantially homogenous mixture. The static mixer 25 may be heated to a temperature that allows the reactants to remain in a liquid non-polymerized state, such as between about 70 and 120° C. for reactive resins that include caprolactam.

The lower belt 31 is used in combination with an upper 32 and these two components form a double belt mechanism that is used to compress the reactive resin and lightweight material during polymerization of the reactive resin. Specifically, the upper belt 32 is positioned atop the lower belt 31 and the two belts are configured to compress or squeeze the reactive resin, lightweight material, and any other material that is passed through the double belt mechanism. At least a portion of the double belt mechanism is positioned within a curing oven 30. In some embodiments, the top belt 32 is fully enclosed within the curing oven 30. The lower belt 31 has a longitudinal length that is substantially longer than the upper belt 32. The lower belt 31 may extend outward from the upper belt 32, by between 2 and 15 feet, and more commonly between 3 and 10 feet. In a specific embodiment, the lower belt 31 extends from the upper belt 32 by between 6 and 9 feet and more specifically about 8 feet.

The lower belt 31 typically extends outward from the upper belt 32 so that one or more of the components of the system may be positioned atop the lower belt 31. For example, a lightweight material application mechanism 37 is positioned atop the lower belt 31. The lightweight material application mechanism 37 is configured to apply a lightweight material atop the lower belt 31 to form a layer of lightweight material atop the lower belt 31. The lightweight material that is applied to the lower belt 31 may include or consist of hollow glass microspheres, perlite, other lightweight materials, and/or any combination thereof.

The lightweight material application mechanism 37 applies the lightweight material to the lower belt 31 as the lower belt 31 is moved past and typically underneath the lightweight material application mechanism 37. In some embodiments, the lightweight material may be applied to form a layer that is between 0.5 mm and 10 mm thick, and more commonly between 1 mm and 5 mm thick. The thickness may be estimated based on the bulk density of the lightweight material, the application rate of the lightweight material, and the speed of lower belt 31. The thickness and/or density of the layer of lightweight material depends on the speed of the lower belt 31, the speed of distribution of the lightweight material application mechanism 37, the bulk density of the lightweight material, and the like.

Figure 2:
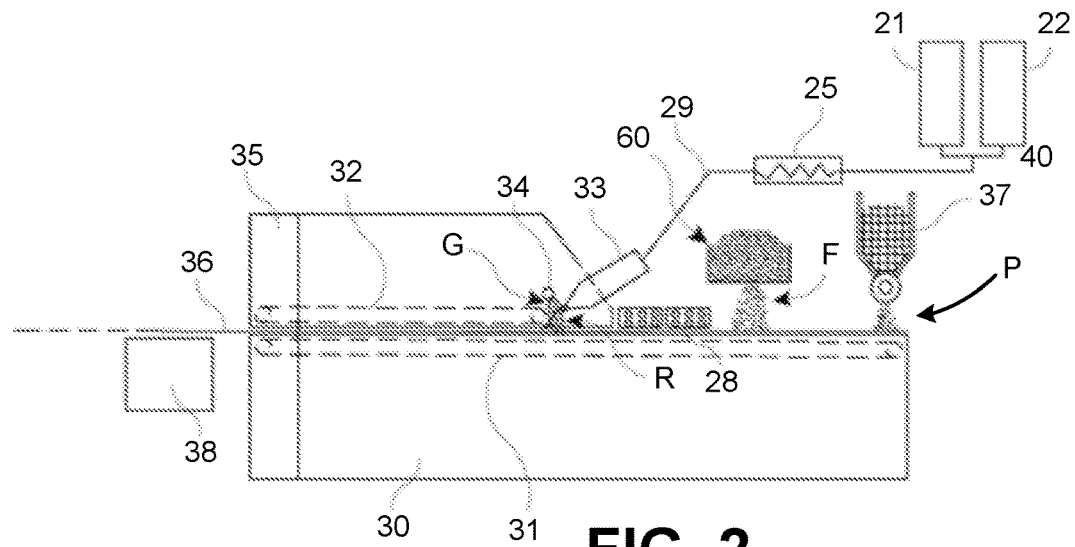

The lightweight material application mechanism 37 may include a hopper within which the lightweight material is positioned. The lightweight material is typically in powder form and the lightweight material application mechanism 37 is typically a powder applicator that is configured to disperse powders P of the lightweight material atop the lower belt 31. Additional filler materials may be included in the hopper of the lightweight material application mechanism 37 when it is desired to include filler material in the thermoplastic composite sheet. In other embodiments, a separate application mechanism 60 may be employed and one or more filler materials F, or a second lightweight material, may be dispersed from the separate application mechanism 60 (see FIG. 2). The one or more filler materials F, or a second lightweight material, may be dispersed atop the lightweight material and may form a separate layer atop the lightweight material layer. In other embodiments, the separate application mechanism 60 may be positioned immediately adjacent the lightweight material application mechanism 37 and the lightweight material P and one or more filler materials F, or a second lightweight material, may be dispersed simultaneously from the respective application mechanisms. In such instances, the two materials may mix and combine as they fall atop the lower belt 31 and may form a single homogenous layer of the two materials.

The lower belt 31 carries or conveys the layer of lightweight material toward the other components of the system and/or toward an entrance to the curing oven 30. The layer of lightweight material may be subjected to a drying mechanism 28 that removes residual moisture from the surface of the lightweight material. The drying mechanism 28 may be positioned atop the lower belt 31 so that it is above the layer of lightweight material. The drying mechanism 28 dries the lightweight material as the layer of lightweight material is moved underneath the drying mechanism 28. The drying mechanism 28 may be an infrared heater that raises the temperature of the layer of lightweight material and thereby removes any residual adventitious moisture. The drying mechanism 28 ensures that the layer of lightweight material is sufficiently dried before the application of the reactive resin. The drying mechanism also keeps the lightweight material relatively hot so that when the reactive resin is applied, the reactive resin does not cool down and harden. The drying mechanism 28 may remove trace amounts of surface moisture from the lightweight material.

After the layer of lightweight material is dried via the drying mechanism 28, the reactive resin is applied to the layer of lightweight material using a resin applicator 33 that is positioned atop the lower belt 31 and above or adjacent the layer of lightweight material. The resin applicator 33 applies the reactive resin R, which is typically monomers and/or oligomers of a polymer material, to the lightweight material as the layer of lightweight material is moved past and typically underneath the resin applicator 33. In some embodiments, the resin applicator 33 is a slot die having a narrow opening through which the reactive resin R flows, such as an opening of about 1.0 mm or less. The reactive resin R is delivered to the resin applicator 33 from the static mixer 25 via tubing 29, which may be heated to maintain a temperature of the reactive resin.

The reactive resin R may be applied to the layer of lightweight material close to the curing oven 30 in order to minimize exposure of the reactive resin to the surrounding air and environment. In some embodiments, the resin applicator 33 may be positioned within 10 inches of an inlet of the curing oven 30 and more commonly within 5.0 inches or even 1.0 inches of the curing oven's inlet. In other embodiments, a distal or delivery end of the resin applicator 33 may be positioned within a hood or cover of the curing oven 30 as illustrated in FIG. 1. The resin applicator 33 may be temperature controlled within a desired temperature range, for example between a temperature of 70° C. and 120° C. for the reactive resin that includes caprolactam. The resin applicator 33 may include a thermocouple and heating cartridge or other heating component to ensure that the resin applicator 33 remains within the desired temperature range.

As an alternative to the slot die, the resin applicator 33 may also include a spray application, curtain coating, kiss roll application, doctor blade application, or even powder coating of pre-ground solid resins in which the curing oven melts the reactive components.

The liquid handling lines 29 between the holding tanks, the static mixer, and the resin applicator are typically insulated and/or heated to minimize heat loss as the resin mixtures flow through the handling lines. Controlling the temperature of the liquid materials ensures that the resin R does not solidify and/or prematurely react within the handling lines. The temperature of the reactive resin is also typically maintained within a desired temperature range in order to maintain the reactive resin in a liquid or molten state while preventing premature polymerization of the resin prior to the curing of the material in the oven. Once the layer of lightweight material is coated with the reactive resin R, the surrounding environment in the vicinity of the layer of lightweight material is typically controlled to ensure that the reactive resin is not exposed to ambient moisture in the environment. Exposure of the reactive resin R to ambient moisture may reduce the conversion of the reactive resin, which may result in a degree of polymerization less than 90%.

The surrounding environment may be controlled by housing or enclosing the system in a room or area in which the environment is maintained substantially moisture-free. Various dehumidification techniques can also be used to remove moisture from the ambient air in the room or area. Exemplary dehumidification techniques include desiccant dehumidification, refrigerant dehumidification, and electrostatic dehumidification. More commonly, the system employs a moisture purge mechanism that is operable to ensure that the humidity in the air surrounding the coated layer of lightweight material is substantially zero. For example, the system may employ a moisture purge mechanism that is operable to maintain the relatively humidity in the air surrounding the coated layer of lightweight material to be below 1%. Typically the moisture purge mechanism need only be employed in the vicinity of the resin applicator 33 since the layer of lightweight material is free of the reactive resin R prior to the resin applicator 33. The moisture purge mechanism may be positioned proximally of the resin applicator 33 or distally of the resin applicator 33 as desired. In either instance, however, the moisture purge mechanism should be positioned relatively close to the resin applicator 33 to minimize exposure of the reactive resin to the surrounding air.

The moisture purge mechanism includes an air/gas plenum or tube 34 that blows a moisture-free gas G onto the layer of lightweight material. The air/gas plenum or tube 34 is positioned atop the lower belt 31 and atop the layer of lightweight material. The air/gas plenum or tube 34 may be positioned directly adjacent the resin applicator 33 as illustrated in FIG. 1 so that the moisture-free gas G is blown directly onto the layer of lightweight material as the layer of lightweight material is coated with the reactive resin R from the resin applicator 33. In a specific embodiment, the air/gas plenum or tube 34 blows dry nitrogen onto the layer of lightweight material. The air/gas plenum or tube 34 ensures that the area or vicinity around or adjacent the coated layer of lightweight material and/or in the vicinity of the curing oven's inlet is kept substantially free of moisture. The air/gas plenum or tube 34 should supply a sufficient amount of moisture-free gas G to keep the area around the coated layer of lightweight material substantially free of moisture, but the applied moisture-free gas G should not be too strong so that the layer of lightweight material is distorted by the moisture-free gas G or so that some of the lightweight material is blown away.

After the layer of lightweight material is coated with the reactive resin R and/or the purge gas G is applied to the coated layer of lightweight material, the coated layer of lightweight material is then subjected to a press mechanism to ensure that a complete wet-out of the layer of lightweight material by the reactive resin is achieved and/or to ensure that the reactive resin remains dispersed within the layer of lightweight material. The press mechanism function is performed by the upper belt 32 and the lower belt 31, which form a double belt compression mechanism. As illustrated in FIG. 1, a distal end of the upper belt 32 may be positioned proximally of the curing oven's inlet, which distance may ensure sufficient room for the distal end of the resin applicator 33 and air/gas plenum or tube 34 to be positioned within the curing oven 30 between the upper belt 32 and curing oven inlet. The upper belt 32 and lower belt 31 compress the coated layer of lightweight material as these materials are passed through the curing oven 30. The compression of the coated layer of lightweight material facilitates in the reactive resin (e.g., monomers and/or oligomers) fully saturating the lightweight material and therefore, all the lightweight material is completely wet out by the reactive resin. The compression of the coated layer of lightweight material between the upper belt 32 and lower belt 31 also minimizes exposure of the coated layer of lightweight material to ambient moisture in the surrounding environment. In some embodiments, the pressing function may be achieved by one or more calendars or rollers that press or squeeze the reactive resin through the layer of lightweight material.

The lower and upper belts, 31 and 32, pass the coated layer of lightweight material through the curing oven 30. The temperature of the curing oven 30 is maintained at a temperature that ensures complete polymerization of the reactive resin. Stated differently, the curing oven 30 is maintained at a polymerization temperature at which the monomers and/or oligomers start to polymerize, which is typically about 100° C. or more. For a reactive resin composition that includes caprolactam, the polymerization temperature may be about 120° C. or more (e.g., about 120° C. to about 220°). For prepreg manufacturing processes where the polymerized resin matrix is not melted, an upper limit on the polymerization temperature for the monomers and/or oligomers may be the melting temperature of the polymer. For example, a reactive resin composition that includes caprolactam may have a upper limit of a polymerization temperature that is the melting temperature of the polyamide-6 (i.e., ~220° C.). The coated layer of lightweight material may be exposed to the curing oven 30 for a time which is sufficient to ensure complete polymerization of the reactive resin material. For example, for a reactive resin composition that includes caprolactam, the residence time of the coated layer of lightweight material in the curing oven may be about 3 minutes to ensure the complete polymerization of caprolactam. Upon polymerization of the reactive resin, a polymer material matrix is formed within which the lightweight material is disposed. The lightweight material is locked within the polymer material matrix and the polymer material matrix and lightweight material form the thermoplastic composite sheet 36. The thermoplastic composite sheet may also include any other filler materials that are added during the manufacture process.

In some embodiments, a distal end of the curing oven 30 includes a cooling mechanism 35 that is configured to cool a fully cured thermoplastic composite sheet 36. The cooling mechanism 35 may cool the thermoplastic composite sheet 36 in order to allow the thermoplastic composite sheet 36 to be cut to size, to be handled by an individual, to reduce or prevent warpage of the thermoplastic composite sheet 36, or for any other reason. The cooling mechanism 35 typically cools the thermoplastic composite sheet 36 to below 50° C. and more commonly to at or near ambient temperature, which allows the thermoplastic composite sheet 36 to be handled by an individual without burning or harming the individual. The cooling mechanism 35 may include chilled water cooling.

The system may also include a cutting mechanism 38 that is configured to cut the thermoplastic composite sheet 36 into individual sheets, which may be stacked atop one another. The system of FIG. 1 is designed so that the process is performed in a time of 20 minutes or less, and more commonly 10 minutes or less. In some embodiments, the process may be performed in 5 minutes or less.

Although the lower belt 31 is illustrated as extending from the inlet of the curing oven 30, in some embodiments the lower belt 31 may be fully enclosed within the curing oven 30, or within a hood or cover of the curing oven. In such embodiments, the lower belt 31 extends beyond the distal or front edge of the upper belt 32 so that the other components of the system are able to remain positioned above the lower belt 31. In such an embodiment, the other components of the system are typically enclosed within curing oven 30, or within a hood or cover of the curing oven 30.

The lightweight material may include a sizing composition having a coupling agent that promotes bonding between the lightweight material and the thermoplastic resin. For example, the sizing composition may include a coupling activator that covalently bonds the polymerization activator moiety to the lightweight material. In such instances, the bond between the lightweight material and the resulting thermoplastic material may be significantly strengthened or enhanced. In a specific embodiment, the sizing contains a mixture of silane coupling agents, polymeric film formers, and other additives that are designed to enhance the interfacial bonding between the lightweight material and a polyamide-6 matrix. In some instances, a reactive silane may be used that allows some of the polymerization to be initiated directly from the lightweight material surface. The reactive silane may improve the coupling between the lightweight material and the resin matrix.

In some embodiments, the activator may be included on the surface of the lightweight material. In such instances, only a single holding tank (e.g., tank 21) that contains the resin and catalyst may be used in the system, or a reduced amount of the activator may be mixed with the resin in the second holding tank (e.g., tank 22). In some embodiments, the two holding tanks, 21 and 22, may each include a different resin material. For example, a first holding tank 21 may include caprolactam while the second holding tank 22 includes laurolactam. In such instances, a combination of two or more types of reactive monomers and/or oligomers may be applied to the layer of lightweight material.

Figure 3:
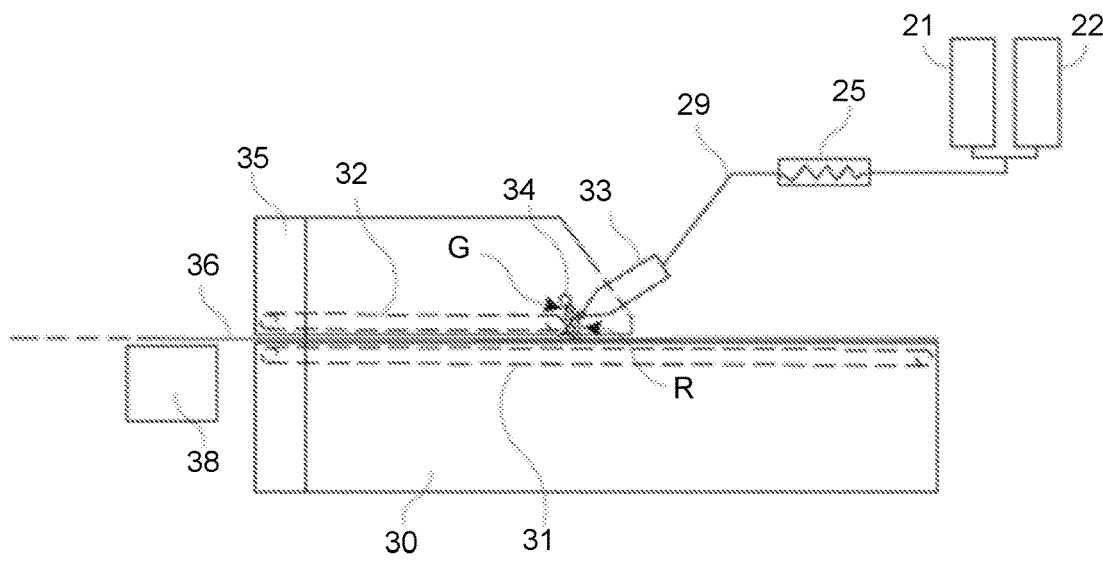

In some embodiments, the lightweight material application mechanism 37 may be removed from the system. In such embodiments, the resin applicator 33 may be configured to simultaneously apply the reactive resin and the lightweight material (e.g., hollow glass microspheres) to the lower belt 31 as the lower belt 31 is moved past and typically underneath the resin applicator 33. This system is illustrated in FIG. 3 in which the lightweight material application mechanism 37 is removed. In one embodiment, the lightweight material may be contained in either or both holding tanks, 21 and 22, along with the reactive resin R or other materials. In such embodiments, the mixture of the reactive resin R and lightweight material is constantly agitated to ensure that the materials remain homogenously mixed together within the holding tanks.

The reactive resin R and lightweight material is delivered to the mixing head 25 from either or both holding tanks, 21 and 22, so that all of the materials from the holding tanks, 21 and 22, is thoroughly mixed. The homogenous mixture of the reactive resin R and lightweight material is then applied onto the lower belt 31 via the resin applicator 33. The reactive resin R and lightweight material mixture may be applied close enough to the curing oven 30 so that polymerization is initiated essentially immediately after application of the reactive resin R and lightweight material mixture to the lower belt 31. The immediate initiation of polymerization aids in locking or trapping the lightweight material within the polymer material matrix and reduces or prevents separation or stratification of the two materials.

In addition or alternatively, the ratio of reactive resin R to lightweight material may be within a range that ensures that the two materials will not separate and/or stratify. Specifically, the use of an appropriate amount of reactive resin R may ensure that the resin remains mostly coated on the lightweight materials (e.g., on the surface of the hollow glass microspheres) and does not separate from the lightweight materials. The reactive resin R may also remain in contact with the lightweight materials due to capillary forces. When an appropriate ratio of lightweight material and reactive resin R is employed, the coating and/or capillary forces may be sufficient to ensure that the reactive resin R remains in contact with the lightweight material until polymerization is initiated, resulting in the formation of the thermoplastic polymer, which functions to bind or adhere the lightweight material together. An appropriate ratio of lightweight material to reactive resin R may be an amount of liquid resin that results in a coating of the reactive resin R on the hollow glass microspheres that forms a thin coating layer on the hollow glass microspheres without essentially any excess liquid resin. This amount of resin would ensure that the resin remains in contact with the hollow glass microspheres. These application techniques may also be employed in the systems of FIGS. 1 and 2 to ensure that the lightweight material and the reactive resin R do not separate and/or stratify.

In some embodiments, the lightweight material may be maintained separately from the resin materials in the holding tanks, 21 and 22, and may be introduced directly into the mixing head 25 to homogenously mix with the reactive resin R. The mixing head 25 may be specifically designed to homogenously mix the lightweight material and reactive resin R. The homogenously mixed lightweight material and reactive resin R may then flow to the resin applicator 33 and be applied atop the lower belt 31. In yet other embodiments, the resin applicator 33 may be configured to disperse or apply both the reactive resin R and the lightweight material immediately adjacent one another. For example, the resin applicator 33 may include a powder application mechanism that is positioned immediately adjacent an opening or slot that dispenses the reactive resin R. The reactive resin R and the lightweight material may mix as the components are dispersed or applied by the resin applicator 33 atop the lower belt 31. The systems of FIGS. 1-3 do not include devices or mechanisms (e.g., fiber choppers, fiber scattering devices, etc.) that are configured to disperse or apply reinforcing fibers, other fibers, or fibrous materials to the lower belt 31. As such, reinforcing fibers, other fibers, or fibrous materials are not applied by the systems of FIGS. 1-3 and as such, the resulting thermoplastic composite sheet 36 is free of reinforcing fibers or other fibrous materials.

Fully Polymerized Resin Systems

As previously described, in some embodiments the polymer material matrix of the thermoplastic composite sheet may be formed by melting fully polymerized thermoplastic resins. Fully polymerized as used herein means that the thermoplastic resins do not include any unpolymerized or partially polymerized materials, such as monomers or oligomers. Stated differently, the thermoplastic composite sheet does not include unpolymerized or partially polymerized materials, such as partially polymerized b-stage resins or materials that are often employed in thermoset prepregs. Partially polymerized b-stage prepregs may increase the flowability of the resin within the prepregs, but these materials often require special handling, such as refrigeration, and often have an expiration date upon which the b-stage material will begin to degrade. Partially polymerized b-stage prepregs are generally tacky and typically require the use of two release liners that are positioned on opposite sides of the prepreg. In contrast, the fully polymerized thermoplastic composite sheets may be stored at ambient temperatures essentially indefinitely and require far less care in handling.

Fully polymerized thermoplastic resins may include, but is not limited to, polyolefins, polypropylene (PP), high-density polyethylene (HDPE), polyamides (including PA6 and PA6,6), polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM) resins, polyethyleneimine (PEI), polyether ether ketone (PEEK), polyacrylonitrile, copolyacrylonitriles including poly(styrene-co-acrylonitrile) (SAN), or any combination thereof. In preferred embodiments, polypropylene is used as the thermoplastic resin, because of its low cost and low density.

The thermoplastic resin may be applied to the layer of lightweight material in a variety of ways including as a powder, as a film, as melt thermoplastic resin sheet, as polymer resin fibers, or any combination thereof. In a specific embodiment, powder thermoplastic resin is applied to the layer of lightweight material. The lightweight material is typically also a powder and as such, the two powders may be dispersed atop the lower belt so that the two powders easily mix. For example, the powder applicators that apply each powder may be positioned immediately adjacent one another and the thermoplastic resin powder and lightweight material powder may be dispersed simultaneously atop the lower belt. In other embodiments, the thermoplastic resin powder and lightweight material powder may be mixed together and dispersed via a single powder applicator. In other embodiments, the lightweight material powder may be mixed with polymer resin fibers, a thermoplastic film may be positioned on one surface of the lightweight material, or a thermoplastic material may be extruded onto the lightweight material. Each of these delivery methods are described in greater detail below.

Figure 4:
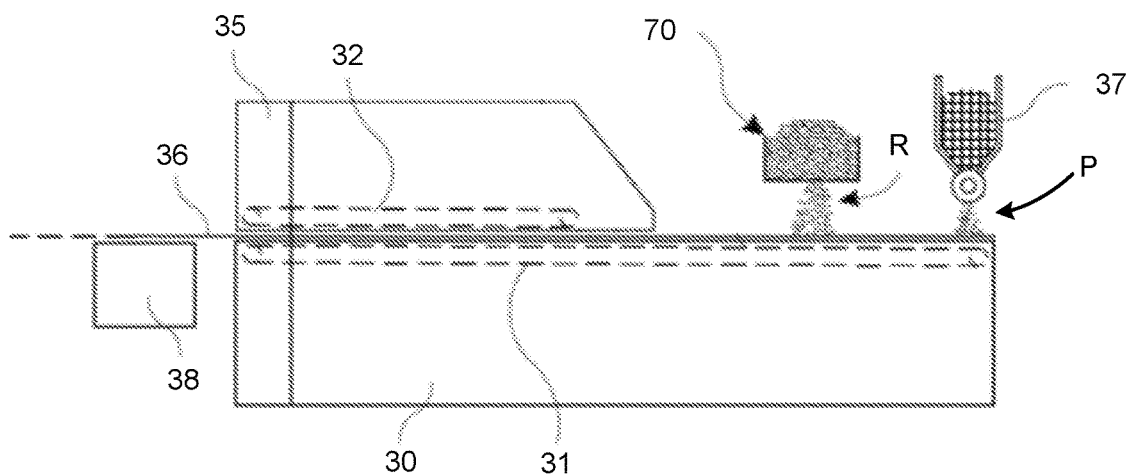
FIGS. 4-6 illustrate systems that employ fully polymerized resins to produce a thermoplastic composite sheet.
Figure 5:
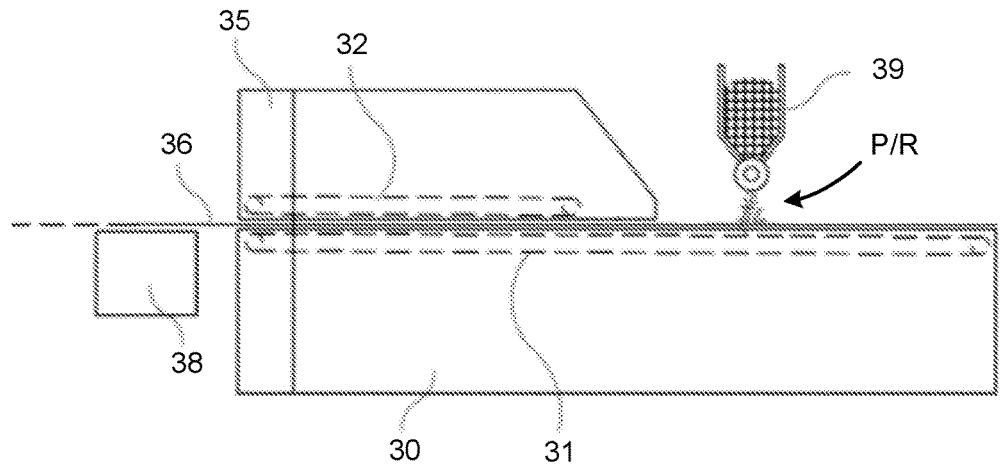
Figure 6:
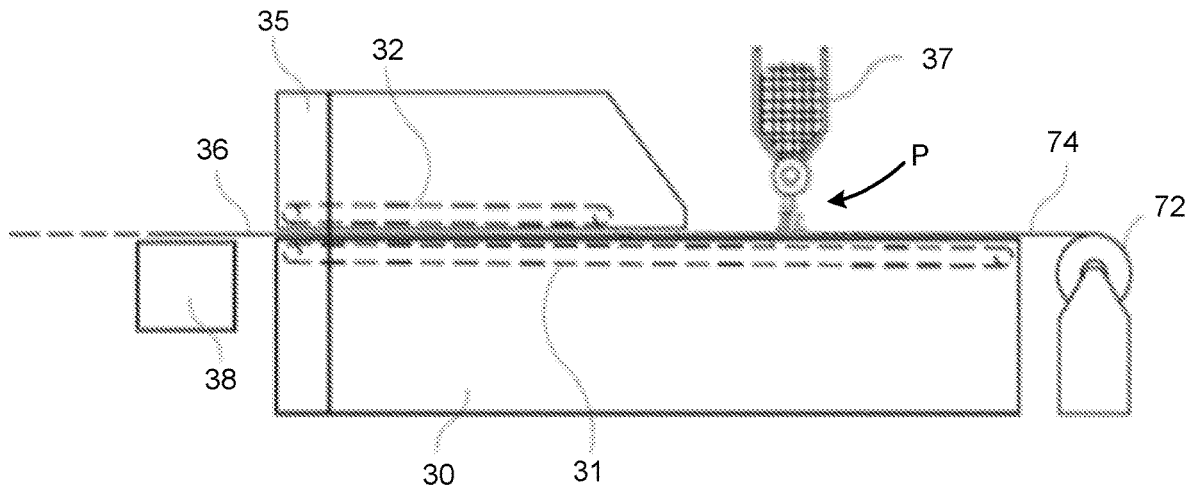

Referring to FIGS. 4-6, illustrated are systems that are configured to form the thermoplastic composite sheets using fully polymerized thermoplastic resins. The systems are similar to the systems of FIGS. 1-3 and thus, similar reference numbers are used to denote similar components. Specifically, the systems include an oven 30, a lower belt 31, an upper belt 32, a cooling mechanism 35, and a cutting mechanism 38. The systems may also include a drying mechanism 28 that is configured to remove residual moisture from the lightweight material and/or resin as the lightweight material and/or resin are moved past the drying mechanism.

The upper belt 32 and lower belt 31 are components of a double belt press mechanism as described herein. The oven 30, however, it not intended to cure reactive resin, but is instead intended to melt the fully polymerized thermoplastic resin. As such, the temperature of the oven 30 is maintained at a temperature above the melting point of the specific thermoplastic resin, or resins, employed to form the thermoplastic composite sheet. The systems do not include liquid holding tanks, mixing heads, or dies that are designed to apply liquid reactive resins since these components are unique to the reactive resin systems. The systems also do not include a gas purge mechanism that applies a moisture free gas to the lightweight material and resins since ambient moisture is not a concern when fully polymerized thermoplastic materials are used.

The systems do include a lightweight material application mechanism 37 that is positioned atop the lower belt 31 and that is configured to apply a lightweight material onto the lower belt 31. The lightweight material is typically in powder or granule form P and thus, the lightweight material application mechanism 37 is typically a mechanism that is able to disperse or apply powder or granulated lightweight materials P. A powder/granule applicator may include a powder/granule feeding device, a funnel shaped hopper, and/or a scattering roller, which is configured to pick up powder/granules from the hopper, and may also include a doctor blade, which ensures an even dosing of the powder/granules over the entire application width. The lightweight material application mechanism 37 applies the lightweight material powder P atop the lower belt 31 to form the layer of lightweight material.

The system also includes a resin applicator 70 that is configured to apply the thermoplastic resin R atop the lower belt 31 and onto the layer of lightweight material. The resin applicator 70 may be a device that is configured to disperse a thermoplastic resin powder or that is configured to disperse polymer resin fibers. For example, in some embodiments the resin applicator 70 is a powder application device that disperse or applies a thermoplastic resin powder atop the lower belt 31 while in other embodiments the resin applicator 70 is a fiber chopper or fiber scattering device that disperses or applies polymer resin fibers atop the lower belt 31. In other embodiments, the resin applicator 70 may be any combination of a powder application device, a fiber chopper, and/or a fiber scattering device. A fiber chopper may include a cutting roller onto which multiple blades are mounted and a backup roller. The rotation of the cutting roller may cut rovings against the backup roller and disperses the chopped rovings. A fiber scattering device may include a fiber feeding device, a hopper, a scattering roller, and/or a brush-off roller. The thermoplastic resin powders and the polymer resin fibers are configured to melt within the oven 30 to enable the thermoplastic resin to be mixed with and dispersed throughout the layer of lightweight material.

For ease in describing the embodiments, the disclosure will generally reference a resin applicator 70, although it should be realized that this designation may refer to any one, or any combination of, a powder application device, a fiber chopper, and/or a fiber scattering device. Similarly, the disclosure will generally refer to a thermoplastic resin R, although it should be realized that this designation may refer to thermoplastic resin powders, polymer resin fibers, or any combination thereof. In addition, the lightweight material application mechanism 37 is illustrated as being positioned proximally of the resin applicator 70, although it should be realized that the position of the resin applicator 70 and lightweight material application mechanism 37 may be switched so that the resin applicator 70 is positioned proximally of the lightweight material application mechanism 37.

In some embodiments, the lightweight material application mechanism 37 and the resin applicator 70 are positioned immediately adjacent one another so that the lightweight material P and the thermoplastic resin R are dispersed essentially simultaneously atop the lower belt 31. This positioning of the lightweight material application mechanism 37 and the resin applicator 70 and the simultaneously dispersion of the lightweight material and thermoplastic resin R helps ensure that the thermoplastic resin R is dispersed more homogenously or uniformly throughout the layer of lightweight material. For example, in one embodiment, the lightweight material application mechanism 37 may be positioned immediately adjacent a powder application device so that the lightweight material P is applied atop the lower belt 31 as the thermoplastic resin powder R is simultaneously dispersed atop the lower belt 31. The thermoplastic resin powder R and lightweight material P may mix as the materials fall atop the lower belt 31. Alternatively, the lightweight material application mechanism 37 may be positioned immediately adjacent a fiber chopper or fiber scattering device so that the lightweight material P is applied atop the lower belt 31 as the polymer resin fibers R are simultaneously dispersed atop the lower belt 31. The polymer resin fibers R and lightweight material P may mix as the materials fall atop the lower belt 31.

In other embodiments, the lightweight material P may be applied to the lower belt 31 and the thermoplastic resin R may be applied atop a layer of the lightweight material P. In other embodiments, the polymer resin fibers R may be applied atop the lower belt 31 to form a web or mesh of polymer resin fibers R and the lightweight material P may be applied to the web or mesh of polymer resin fibers R. In any embodiment, the thermoplastic resin R may penetrate into the layer of lightweight material P, or vice versa, so that the thermoplastic resin R is disposed at least partially within the layer of lightweight material P.

After application of the lightweight material P and thermoplastic resin R to the lower belt 31, the materials are transported to the oven 30 and to the double belt press mechanism. The oven melts the thermoplastic resin R, which allows the melted resin to flow within and through the layer of lightweight material. To facilitate in the flow of the thermoplastic resin R within the layer of lightweight material P, the lower and upper belts, 31 and 32, compress the thermoplastic resin R and the layer of lightweight material P. This compression forces the melted thermoplastic resin R to flow within the layer of lightweight material and to fully saturate that layer of lightweight material. The materials are then cooled via the cooling mechanism 35 so that the thermoplastic resin hardens and forms the polymer material matrix with the lightweight material dispersed therein. The hardened materials form the thermoplastic composite sheet 36, which is then cut into individual sheets via the cutting mechanism 38. As previously described, the system may include a drying mechanism that is configured to remove residual moisture from the lightweight material P and/or thermoplastic resin R as the lightweight material P and/or thermoplastic resin R are moved past the drying mechanism. Removing residual moisture from the lightweight material P and/or thermoplastic resin R may prevent or eliminate the formation of voids in the thermoplastic composite sheet 36 and/or enhance the process of melting the thermoplastic resin R during formation of the thermoplastic composite sheet 36.

FIG. 5 illustrates a similar system except that the resin applicator 70 is removed. In FIG. 5, a single device or mechanism 39 is used to apply both the thermoplastic resin R and the lightweight material P. In a specific embodiment, the single device or mechanism 39 is a powder application device. The powder application device is configured to apply a powder lightweight material P simultaneously with the powder thermoplastic resin R. In such embodiments, the powder application device functions as both the lightweight material application mechanism 37 and the resin applicator 70. The powder lightweight material P and the powder thermoplastic resin R may be stored in a single hopper of the powder application device or may be stored in separate hoppers of the powder application device. The use of the single device or mechanism 39 and the simultaneous dispersion of the powder lightweight material P and the powder thermoplastic resin R helps ensure that the powder lightweight material P and the powder thermoplastic resin R are uniformly or homogenously mixed in a material layer that is formed atop the lower belt 31. This uniform or homogenous mixing of the materials helps ensure that the lightweight material is uniformly distributed within the polymer material matrix of the thermoplastic composite sheet.

In other embodiments, the single device or mechanism 39 is a fiber scattering device that is configured to simultaneously disperse the polymer resin fibers R and the lightweight material P atop the lower belt 31. In such embodiments, the fiber scattering device functions as both the lightweight material application mechanism 37 and the resin applicator 70. The lightweight material P and the polymer resin fibers R may be stored in a single hopper of the fiber scattering device or may be stored in separate hoppers of the fiber scattering device. The use of the single device or mechanism 39 and the simultaneous dispersion of the lightweight material P and the polymer resin fibers R helps ensure that the lightweight material P and the polymer resin fibers R are uniformly or homogenously mixed in the web or mesh that is formed atop the lower belt 31. This uniform or homogenous mixing of the materials helps ensure that the lightweight material is uniformly distributed within the polymer material matrix of the thermoplastic composite sheet. The weight percentage of hollow glass microspheres in the thermoplastic composite sheet may be between 1% and 50%, preferably between 2% and 40%, and more preferably between 5% and 30%, based on the total weight of the thermoplastic composite sheet. The weight percentage of the polymer resin fibers R and/or powder thermoplastic resin R may be between 50% and 99%, preferably between 60% and 98%, and more preferably between 70% and 95%, based on the total weight of the thermoplastic composite sheet.

FIG. 6 illustrates a similar system except that the resin applicator is a roller 72 about which a thermoplastic resin film 74 is wound. In the system of FIG. 6, the thermoplastic resin is applied to the lightweight material P by unrolling the thermoplastic resin film 74 atop the lower belt 31 so that the thermoplastic resin film 74 is positioned under the lightweight material P, atop the lightweight material P, or both under and atop the lightweight material P. To apply the thermoplastic resin film 74 atop the layer of lightweight material P, the roller 72 would be positioned after the lightweight material application mechanism 37 so that the thermoplastic resin film 74 is unwound atop the lightweight material P. The thermoplastic resin film 74 is configured to melt within the oven 30 in a manner similar to the powder thermoplastic resin and/or polymer resin fibers. The melted thermoplastic material is pressed within the layer of lightweight material P via the lower and upper belts, 31 and 32, as described herein. The thermoplastic resin film 74 may be used in combination with, or as an alternative to, the powder thermoplastic resin and/or polymer resin fibers. In some embodiments, the resin applicator may be an extruder device (not shown) that is configured to extrude a molten thermoplastic resin sheet atop the lightweight material P or that is configured to extrude a molten thermoplastic resin sheet that includes the lightweight material.

The thermoplastic resins employed in FIGS. 4-6 are able to fully saturate the layer of lightweight material. The double press mechanism facilitates in a wet-out of the layer of lightweight material by the thermoplastic resin. The pressing function is performed by the upper belt 32 and the lower belt 31, which compress the thermoplastic resin coated layer of lightweight material as the layer of lightweight material and thermoplastic resin is passed through the oven 30. Fully saturating the layer of lightweight material means that thermoplastic resin impregnates the layer of lightweight material from one surface of the lightweight material layer to an opposite surface of the lightweight material layer. Stated differently, fully saturating the layer of lightweight material means that the thermoplastic resin is disposed through an entire thickness of the lightweight material layer or thermoplastic composite sheet.

In some embodiments, the lightweight material P includes a sizing composition having a coupling agent that promotes bonding between the lightweight material P and thermoplastic resin. In such instances, the bond between thermoplastic resin and the lightweight material P may be significantly strengthened or enhanced. In specific embodiments, the sizing contains a mixture of silane coupling agent, polymeric film former, and other additives that are designed to enhance the interfacial bonding between the lightweight material P and a polymer material matrix.

The systems of FIGS. 4-6 do not include devices or mechanisms that are configured to disperse or apply non-polymer resin fibers, such as reinforcing fibers or fibrous materials to the lower belt 31. As such, non-polymer resin fibers, such as reinforcing fibers or fibrous materials are not applied by the systems of FIGS. 4-6. The resulting thermoplastic composite sheet 36 is therefore free of reinforcing fibers, other fibers, or fibrous materials. In addition, since any polymer resin fibers that are initially employed in the systems of FIGS. 4-6 are melted and compressed with the lightweight material, the polymer resin fibers are not in fibrous form in the thermoplastic composite sheet. Rather, the polymer resin fibers transition into a solid thermoplastic material that forms the polymer material matrix of the thermoplastic composite sheet. As such, the thermoplastic composite sheets formed via the systems of FIGS. 4-6 do not include reinforcing fibers, other fibers, or fibrous materials.

Exemplary Thermoplastic Composite Sheet

The above systems may be used to manufacture a thermoplastic composite sheet as described herein. The thermoplastic composite sheet may be composed of or consist of a polymer material matrix and a lightweight material that is disposed throughout the polymer material matrix. The polymer material matrix extends continuously throughout a length, width, and thickness of the thermoplastic composite sheet. The polymer material matrix is a fully polymerized thermoplastic material, which means that the thermoplastic composite sheet does not include unpolymerized pre-polymer materials or resins (e.g., monomers or oligomers), B-stage materials, and the like. Rather, the thermoplastic resin is completely polymerized within the thermoplastic composite sheet.

The lightweight material is disposed throughout the polymer material matrix so that the lightweight material is fully saturated by the thermoplastic material of the polymer material matrix. In a specific embodiment, the lightweight material is hollow glass microspheres, perlite, or a combination of these materials. When the thermoplastic composite sheet is heated to above a melting temperature of the thermoplastic resin, the thermoplastic resin and lightweight material move, flow, and conform to a mold or cavity. Stated differently, when the thermoplastic composite sheet is subjected to a heating and/or pressure process, the thermoplastic resin softens or melts, which allows the thermoplastic composite sheet to be molded or formed into a composite part. In some embodiments, the thermoplastic composite sheet may include one or more filler materials. However, the thermoplastic composite sheet does not include reinforcing fibers, other fibers, or other fibrous materials.

Figure 7:
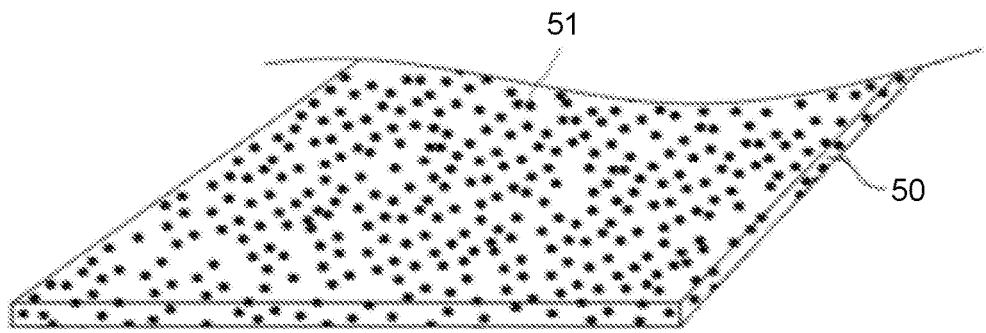
FIG. 7 illustrates a thermoplastic composite sheet.

Referring to FIG. 7, illustrated is a thermoplastic composite sheet that may be formed by one of the systems and/or methods described herein. The thermoplastic composite sheet includes a polymer material matrix 50 and a lightweight material 51 that is dispersed throughout the polymer material matrix 50. The lightweight material 51 is typically uniformly or homogenously dispersed through the polymer material matrix 50, although in some embodiments the lightweight material 51 may be concentrated on or toward one surface of the thermoplastic composite sheet. When the lightweight material 51 is concentrated on or toward one surface of the thermoplastic composite sheet, a second polymer material matrix layer (not shown) may be formed so that the lightweight material 51 is sandwiched between two polymer material matrix layers (not shown).

The thermoplastic composite sheet includes between 50 and 99 weight percent of the thermoplastic material and includes between 1 and 50 weight percent of the lightweight material. The thermoplastic composite sheet may include one or more filler materials, but the thermoplastic composite sheet is free of, or does not include, reinforcing fibers, other fibers, or other fibrous materials. Specifically, the thermoplastic composite sheet does not include glass fibers, carbon fibers, basalt fibers, metal fibers, ceramic fibers, cellulosic fibers, natural fibers, aramid fibers, inorganic fibers, polymer resin fibers, or combinations thereof.

The lightweight material has a density of between 0.1 and 1.0 g/cm$^3$. The lightweight material includes or consists of hollow glass microspheres, perlite, or a combination thereof. Other lightweight materials may also be used. In a specific embodiment, the lightweight material is hollow glass microspheres. In such embodiments, the hollow glass microspheres may have a density of between 0.10 and 0.60 g/cm$^3$ and more commonly about or lower than 0.40 g/cm$^3$. The lightweight material includes a sizing composition having a coupling agent that promotes bonding between the polymer material and the lightweight material.

The thermoplastic resin that forms the polymer material matrix may include or consist of nylons, PBT, PMMA, thermoplastic polyurethane, polyolefins, polypropylene (PP), high-density polyethylene (HDPE), polyamides, polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM), polyethyleneimine (PEI), polyether ether ketone (PEEK), polyacrylonitrile, copolyacrylonitriles including poly(styrene-co-acrylonitrile) (SAN), or combinations thereof. The thermoplastic composite sheet may have essentially any length, width, and/or thickness, although the thermoplastic composite sheet commonly has a thickness of between 0.2 mm and 10 mm, and more commonly have a thickness of between 0.5 mm and 5 mm.

The thermoplastic composite sheet may have a density of between 0.5 and 1.1 g/cm$^3$. The density range may be calculated based on a typical loading of the lightweight material. The density of the thermoplastic composite sheet may be determined according to ISO 1183 (2019). The thermoplastic composite sheets may comprise: a) 50 to 99% by weight of thermoplastic resin; b) 1 to 50% by weight of lightweight material; and c) 1 to 30% by weight of filler material. In preferred embodiments, the thermoplastic composite sheet may comprise: a) 70 to 99% by weight of thermoplastic resin and b) 1 to 30% by weight of lightweight material. In some embodiments, the thermoplastic composite sheet may have a density of 1.0 gram per cubic centimeter or less.

The thermoplastic composite sheet may be cut to any desired length and width. The thermoplastic composite sheets may be subsequently formed into a composite part. For example, one or more layers of the thermoplastic composite sheets may be compression molded into a desired composite part. The thermoplastic composite sheet may be combined with organosheets, prepregs, or other composite sheets that may or may not include fibers or fibrous materials. Exemplary techniques for forming the thermoplastic composite sheets into a composite article include compression molding of a single composite sheet or multiple composite sheets into the article. Pre-heating is typically used to melt the thermoplastic resin, prior to the compression molding of the thermoplastic composite sheet to form the shape of the final article.

The thermoplastic composite sheet may be placed in selected sections of a tool or mold to reinforce the article and/or provide material in places that are difficult to reach for thermoset and/or thermoplastic resins. For example, the thermoplastic composite sheets may be applied to sharp corners and other highly structured areas of a mold or layup used in reactive injection molding processes (RIM), structural reactive injective molding processes (SRIM), resin transfer molding processes (RTM), vacuum-assisted resin transfer molding processes (VARTM), spray-up forming processes, filament winding processes, and long-fiber injection molding processes, among others. The thermoplastic composite sheet may also be used as local reinforcement or for overmolding during injection and compression molding processes including LFT (long fiber thermoplastic) and D-LFT (direct-long fiber thermoplastic).

Exemplary composite products that may be formed from the thermoplastic composite sheets include: automotive components, wind turbine blade components, building and construction components, electrical components, sports and leisure components, and/or other components. Exemplary automotive components include: cockpit, seats, instrument panels, side beams, bottom plate, bottom plate side beam, door trims, body panels, openings, underbody, front/rear modules, engine compartment, engine covers, battery trays, oil pans, bonnets/hoods, fenders, spoilers, and the like.

Methods

Figure 8:
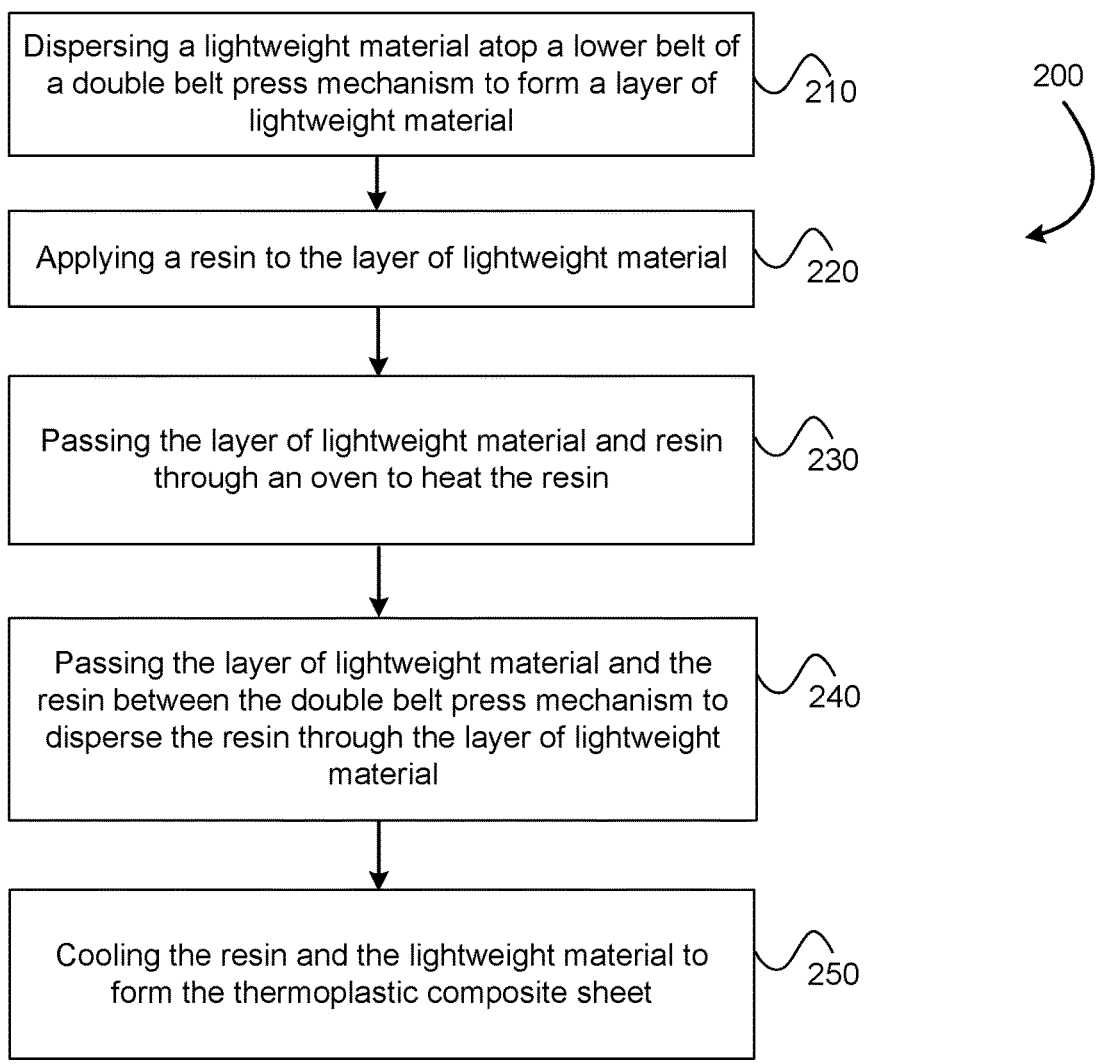
FIG. 8 illustrates a method of forming a thermoplastic composite sheet.

FIG. 8 illustrates a method 200 of forming a thermoplastic composite sheet. At block 210, a lightweight material is dispersed atop a lower belt of a double belt press mechanism to form a layer of the lightweight material atop the lower belt. At block 220, a resin is applied to the layer of lightweight material. At block 230, the layer of lightweight material and the resin are passed through an oven that is configured to heat the resin as the lightweight material and the resin are moved through the oven. At block 240, layer of lightweight material and the resin are passed between the lower belt and an upper belt of the double belt press mechanism to press the resin and the lightweight material and thereby disperse the resin through the layer of lightweight material and fully saturate the lightweight material with the resin. The steps that are illustrated at blocks 230 and 240 typically occur simultaneously or nearly simultaneously, although the steps may occur sequentially with the step at block 230 occurring prior to the step at block 240 or with the step at block 240 occurring prior to the step at block 230. For example, the lightweight material and resin may be passed between the lower belt and the upper belt as these materials enter the oven, before these materials enter the oven, or shortly after these materials enter the oven. At block 250, the resin and the lightweight material are cooled to form the thermoplastic composite sheet. The lightweight material may have a density of between 0.1 and 1.0 g/cm$^3$ and the thermoplastic composite sheet is free of reinforcing fibers, other fibers, or fibrous materials.

In some embodiments, the resin is applied simultaneously with the lightweight material atop the lower belt so that the resin is dispersed throughout the layer of lightweight material. In one embodiment, applying the resin may include dispersing polymer resin fibers atop the lower belt via a fiber chopper or a fiber scattering device to form a web or mesh of polymer resin fibers. The polymer resin fibers are configured to melt within the oven to enable the resin to be mixed with and dispersed throughout the layer of lightweight material. In such embodiments, the lightweight material may be dispersed immediately adjacent the fiber chopper or fiber scattering device so that the lightweight material is applied atop the lower belt as the polymer resin fibers are dispersed atop the lower belt, or the fiber scattering device may be configured to disperse the polymer resin fibers and simultaneously apply the lightweight material atop the lower belt.

In another embodiment, applying the resin may include unrolling a thermoplastic resin film from about a roller so that the thermoplastic resin film is positioned atop the lower belt and is positioned under the lightweight material, atop the lightweight material, or both under and atop the lightweight material. In yet another embodiment, applying the resin may include extruding a molten thermoplastic resin sheet atop the lightweight material or extruding a molten thermoplastic resin sheet that includes the lightweight material. In yet another embodiment, applying the resin may include applying a powder thermoplastic resin to the layer of lightweight material via a powder application device. In such embodiments, the powder application device may be configured to apply a powder lightweight material simultaneously with the powder thermoplastic resin so that the resin is applied to the lightweight material as the layer of lightweight material is formed. The resin may include or consist of one or more of the following thermoplastic resins: polyolefins, polypropylene (PP), high-density polyethylene (HDPE), polyamides, polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM), polyethyleneimine (PEI), polyether ether ketone (PEEK), polyacrylonitrile, copolyacrylonitriles including poly(styrene-co-acrylonitrile) (SAN), or combinations thereof.

In another embodiment, applying the resin may include applying monomers or oligomers to the layer of lightweight material. The monomers or oligomers are polymerizable via the oven to form a polymer material matrix within which the lightweight material is disposed. The lightweight material may be homogenously mixed with the monomers or oligomers so that the resin and the lightweight material are simultaneously applied atop the lower belt to form the layer of lightweight material with the resin dispersed therein. The lightweight material and the monomers or oligomers may be simultaneously applied via a resin die or resin applicator. When the resin includes or consists of monomers or oligomers, the method may also include drying the lightweight material via a drying mechanism as the lightweight material is moved past the drying mechanism to remove residual moisture from the lightweight material, and blowing a moisture-free gas onto one or more surfaces of the coated layer of lightweight material via a gas application mechanism to substantially prevent exposure of the monomers or oligomers to ambient moisture in a surrounding environment. The method may further include mixing the monomers or oligomers with at least one of a catalyst and an activator via a mixing component. The catalyst and activator may facilitate in polymerizing the monomers or oligomers to form the polymer material matrix. The monomers or oligomers may include or consist of lactams, lactones, cyclic olefins, cyclic butylene terephthalate (CBT), methyl methacrylate (MMA), precursors of thermoplastic polyurethane, or mixtures thereof. The lactams may include or consist of caprolactam, laurolactam, or mixtures thereof.

In some embodiments, the method may include applying a sizing composition to the lightweight material. The sizing composition may have a coupling agent that promotes bonding between the lightweight material and the resin. The method may also include cutting the thermoplastic composite sheet into individual sheets via a cutting mechanism. The lightweight material may include or consist of hollow glass microspheres, perlite, or a combination thereof. The method may further include drying the lightweight material and/or resin via a drying mechanism as the lightweight material and/or resin are moved past the drying mechanism to remove residual moisture from the lightweight material and/or resin.

The description and/or claims herein may use relative terms in describing features or aspects of the embodiments. For example, the description and/or claims may use terms such as relatively, about, substantially, between, approximately, and the like. These relative terms are meant to account for deviations that may result in practicing and/or producing the embodiments described herein. For example, the description describes mixtures from two holding tanks as being mixed into a "substantially homogenous mixture". The disclosure also describes purging with "a substantially moisture-free gas" and that the lower belt is in "substantially constant movement" between a starting point and ending point. The term "substantially" is used in these descriptions to account for small deviations or differences from a complete homogenous mixture, a completely moisture-free gas, or an entirely constant movement. For example, a skilled artisan would recognize that the moisture-free gas may include some negligible amount of moisture and that some negligible amount of non-homogeneity may be present within the homogenous mixture. The skilled artisan would also recognize that some minor stoppage or non-movement of the lower belt may occur without departing from the spirit of the disclosure herein. These deviations of differences may be up to about 10%, but are typically less than 5%, or even 1%. A similar rationale applies to any of the other relative terms used herein.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods. The invention has now been described in detail for the purposes of clarity and understanding. However, it will be appreciated that certain changes and modifications may be practice within the scope of the appended claims.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A system for manufacturing a thermoplastic composite sheet, the system comprising:
a double belt mechanism that includes an upper belt and a lower belt, the upper belt being positioned atop the lower belt and the lower belt having a longitudinal length that is substantially longer than the upper belt, the double belt mechanism being configured to compress materials that are passed through the double belt mechanism;
a lightweight material application mechanism that is positioned atop the lower belt, the lightweight material application mechanism being configured to apply a lightweight material atop the lower belt to form a layer of lightweight material atop the lower belt;
a resin applicator that is positioned atop the lower belt, the resin applicator being configured to apply a resin to the layer of lightweight material;
an oven that is configured to heat the resin as the lightweight material and the resin are moved through the oven in order to polymerize the resin or melt the resin; and
a cooling mechanism that is configured to cool the resin and lightweight material to form the thermoplastic composite sheet; wherein:
the double belt mechanism compresses the lightweight material and the resin as the lightweight material and resin are passed through the oven such that the resin is dispersed throughout the layer of lightweight material and saturates the lightweight material;
the lightweight material has a density of between 0.1 and 1.0 g/cm$^3$; and
the thermoplastic composite sheet is substantially free of reinforcing fibers.

2. The system of claim 1, wherein the lightweight material application mechanism and the resin applicator are positioned adjacent one another so that the lightweight material and the resin are dispersed simultaneously atop the lower belt such that the resin is dispersed throughout the layer of lightweight material.

3. The system of claim 1, wherein the resin applicator is a fiber chopper or a fiber scattering device that is configured to disperse polymer resin fibers atop the lower belt to form a web or mesh of polymer resin fibers, wherein the polymer resin fibers are configured to melt within the oven to enable the resin to be mixed with and dispersed throughout the layer of lightweight material.

4. The system of claim 3, wherein the lightweight material application mechanism is positioned adjacent the fiber chopper or fiber scattering device so that the lightweight material is applied atop the lower belt as the polymer resin fibers are dispersed atop the lower belt, or wherein the fiber scattering device is configured to disperse the polymer resin fibers and simultaneously apply the lightweight material atop the lower belt such that the fiber scattering device functions as both the lightweight material application mechanism and the resin applicator.

5. The system of claim 1, wherein the resin applicator is a roller about which a thermoplastic resin film is wound, and wherein the resin is applied to the lightweight material by unrolling the thermoplastic resin film atop the lower belt such that the thermoplastic resin film is positioned under the lightweight material, atop the lightweight material, or both under and atop the lightweight material.

6. The system of claim 1, wherein the resin applicator is an extruder device that is configured to extrude a molten thermoplastic resin sheet atop the lightweight material or that is configured to extrude a molten thermoplastic resin sheet that includes the lightweight material.

7. The system of claim 1, wherein the resin applicator is a powder application device that is configured to apply a powder thermoplastic resin to the layer of lightweight material.

8. The system of claim 7, wherein the powder application device is configured to apply a powder lightweight material simultaneously with the powder thermoplastic resin such that the powder application device functions as both the lightweight material application mechanism and the resin applicator.

9. The system of claim 1, wherein the resin comprises one or more of the following thermoplastic resins: polyolefins, polypropylene (PP), high-density polyethylene (HDPE), polyamides, polyethylene terephthalate (PET), polybutylene terephthalate (PBT), polycarbonate (PC), polyphthalamide (PPA), acrylonitrile-butadiene-styrene (ABS), PC/ABS, thermoplastic polyurethane (TPU), polyphenylene sulfide (PPS), acetal (polyoxymethylene or POM), polyethyleneimine (PEI), polyether ether ketone (PEEK), polyacrylonitrile, copolyacrylonitriles including poly(styrene-co-acrylonitrile) (SAN), or combinations thereof.

10. The system of claim 1, wherein the system further comprises a drying mechanism that is configured to remove residual moisture from the lightweight material as the lightweight material is moved past the drying mechanism.

11. The system of claim 1, wherein the resin applicator is a die that is configured to apply monomers or oligomers to the layer of lightweight material, wherein the monomers or oligomers are polymerizable via the oven to form a polymer material matrix within which the lightweight material is disposed.

12. The system of claim 11, wherein the lightweight material is homogenously mixed with the monomers or oligomers, and wherein the die functions as both the resin applicator and the lightweight material application mechanism so that the resin and the lightweight material are simultaneously applied atop the lower belt to form the layer of lightweight material with the resin dispersed therein.

13. The system of claim 11, wherein the system further comprises:
a drying mechanism that is configured to remove residual moisture from the lightweight material as the lightweight material is moved past the drying mechanism; and
a gas application mechanism that is positioned to blow a moisture-free gas onto one or more surfaces of the layer of lightweight material in order to substantially prevent exposure of the monomers or oligomers to ambient moisture in a surrounding environment.

14. The system of claim 11, wherein the system further comprises a mixing component that mixes the monomers or oligomers with at least one of a catalyst and/or an activator, wherein the catalyst and/or activator facilitate in polymerizing the monomers or oligomers to form the polymer material matrix.

15. The system of claim 11, wherein the monomers or oligomers comprises lactams, lactones, cyclic olefins, cyclic butylene terephthalate (CBT), methyl methacrylate (MMA), precursors of thermoplastic polyurethane, or mixtures thereof.

16. The system of claim 15, wherein the lactams comprise caprolactam, laurolactam, or mixtures thereof.

17. The system of claim 1, wherein the lightweight material includes a sizing composition having a coupling agent that promotes bonding between the lightweight material and the resin.

18. The system of claim 1, wherein the system further comprises a cutting mechanism that cuts the thermoplastic composite sheet into individual sheets, the cutting mechanism being positioned after the oven.

19. The system of claim 1, wherein the lightweight material comprises hollow glass microspheres, perlite, or a combination thereof.

* * * * *